United States Patent
Jaouen et al.

(10) Patent No.: US 12,353,538 B2
(45) Date of Patent: Jul. 8, 2025

(54) METHOD FOR EXECUTING A SOFTWARE PROGRAM BY A PROCESSING UNIT COMPRISING A COMPILATION PHASE

(71) Applicant: STMicroelectronics (Grand Ouest) SAS, Le Mans (FR)

(72) Inventors: Michel Jaouen, Yvre l'Eveque (FR); Loic Pallardy, Rouillon (FR); Ludovic Barre, Le Mans (FR)

(73) Assignee: STMicroelectronics (Grand Ouest) SAS, Le Mans (FR)

(*) Notice: Subject to any disclaimer, the term of this patent is extended or adjusted under 35 U.S.C. 154(b) by 232 days.

(21) Appl. No.: 18/058,130

(22) Filed: Nov. 22, 2022

(65) Prior Publication Data
US 2023/0161863 A1 May 25, 2023

(30) Foreign Application Priority Data
Nov. 25, 2021 (FR) ...................................... 2112500

(51) Int. Cl.
*G06F 21/44* (2013.01)
(52) U.S. Cl.
CPC .................................... *G06F 21/44* (2013.01)
(58) Field of Classification Search
CPC .... G06F 8/41; G06F 12/1483; G06F 12/1491; G06F 21/44; G06F 21/62; G06F 21/74; G06F 21/31
See application file for complete search history.

(56) References Cited

U.S. PATENT DOCUMENTS

| | | | |
|---|---|---|---|
| 9,342,284 B2 * | 5/2016 | Hassanein | G06F 9/45516 |
| 2014/0237609 A1 | 8/2014 | Sharp et al. | |
| 2018/0165226 A1 * | 6/2018 | Krten | G06F 21/54 |
| 2019/0050558 A1 * | 2/2019 | LeMay | G06F 21/54 |

FOREIGN PATENT DOCUMENTS

| | | | | |
|---|---|---|---|---|
| JP | 2006155516 A | * | 6/2006 | G06F 21/51 |

OTHER PUBLICATIONS

"Enclosure: Language-Based Restriction of Untrusted Libraries"—Ghosn et al., EPEL & Microsoft Research, Apr. 23, 2021 https://marioskogias.github.io/docs/enclosure (Year: 2021).*
"Secure Compilation"—Hritcu et al, Sigplan, Jul. 1, 2019 https://blog.sigplan.org/2019/07/01/secure-compilation/ (Year: 2019).*

* cited by examiner

*Primary Examiner* — Randy A Scott
(74) *Attorney, Agent, or Firm* — Slater Matsil, LLP

(57) ABSTRACT

In an embodiment a method includes compiling, by a processor in a compiling phase, a software program intended to be executed by the processor, the processor having secure and non-secure access right level execution contexts, and/or privileged and non-privileged access right level execution contexts and generating, in the compilation phase, instructions in machine language having an exclusively secure access right level when the instructions are intended to be executed in the secure access right level execution context, and instructions having a non-privileged access right level when the instructions are intended to be executed in the non-privileged access right level execution context.

19 Claims, 6 Drawing Sheets

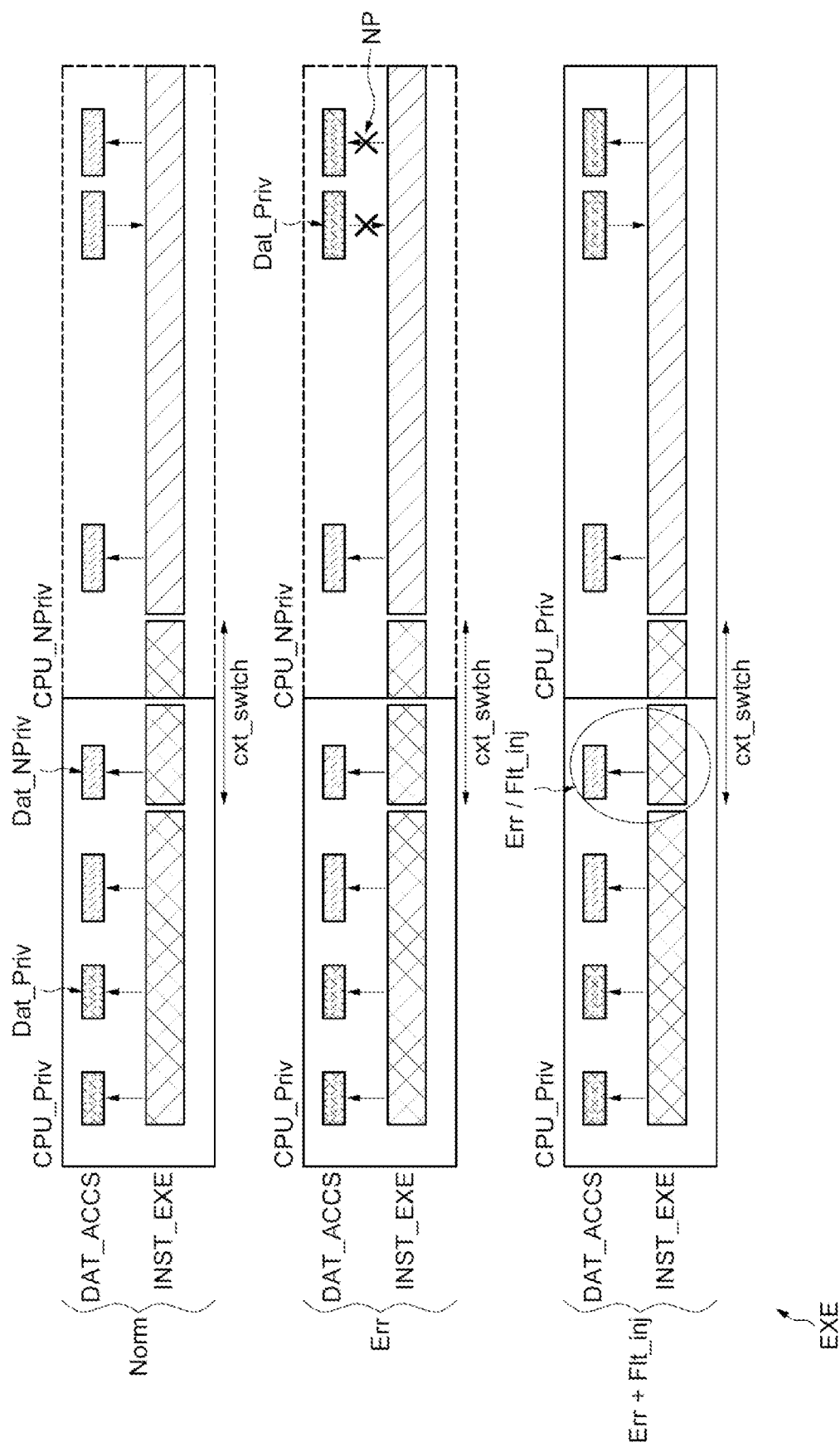

METHOD FOR EXECUTING A SOFTWARE PROGRAM BY A PROCESSING UNIT COMPRISING A COMPILATION PHASE

CROSS-REFERENCE TO RELATED APPLICATIONS

This application claims the benefit of French Application No. 2112500, filed on Nov. 25, 2021, which application is hereby incorporated herein by reference.

TECHNICAL FIELD

The disclosure relates to the execution of a software program by a processing unit comprising a compilation phase, in particular in the context where the execution of the program could have execution contexts having hierarchized access right levels.

BACKGROUND

Typically, the processing unit may belong to a system such as a microcontroller or a microprocessor.

For example, hierarchized access right levels include the privileged and non-privileged access right levels, the privileged access right level being hierarchically higher than the non-privileged access right level.

Other hierarchized access right levels include, for example, the secure and non-secure access right levels, the secure access right level being hierarchically higher than the non-secure access right level.

Conventionally, the privileged level and non-privileged level access rights allow, in particular, enabling access and forbidding access to sensitive functions of the system, for example functions for programming controls of the system, such as the configuration of the system on start-up (commonly referred to as "boot" in English) or programming access rights. Some hardware resources, such as stack registers, could be duplicated in the privileged and non-privileged domains, respectively.

In general, the secure level and non-secure level access rights correspond to a physical separation of secure and non-secure hardware elements, and to a separation of respective memories or memory areas. In general, the secure elements are intended to implement critical security functions such as encryption/decryption accessing to sensitive and secret data.

It should be noted that an execution in secure or non-secure level hardware elements could further have a privileged and non-privileged execution context hierarchy.

When a bug or a fault injection occurs, the system executes uncontrolled operations, to the extent that some instructions might be not executed, some unscheduled instructions might be executed, and still some registers might be used with unexpected values.

Depending on which one of the events hereinabove that occurs, if the system is set in the execution context having the hierarchically higher access right level, then the system could perform nay operation and possibly execute an instruction that should not have the higher access right level. This is a vulnerability of the system that might cause a secret leak, for example in the context of a reverse-engineering thorough analysis.

Reference is made to FIGS. 1A and 1B, schematically illustrating a task execution flow of a processing unit having hierarchized execution contexts.

FIG. 1A illustrates a common problem that might occur between privileged CPU_Priv and non-privileged CPU_N-Priv execution contexts.

In a normal execution Norm, the instructions executed INST_EXE in the privileged mode CPU_Priv could access DAT_ACCS privileged Dat_Priv and non-privileged Dat_NPriv level data; and, the instructions executed INST_EXE in the non-privileged mode CPU_NPriv are normally supposed to access DAT_ACCS only non-privileged level data Dat_NPriv.

In case of error Err in a normal execution, if there are instructions executed INST_EXE in the non-privileged mode CPU_NPriv controlling an access DAT_ACCS to privileged level data Dat_Priv, then the execution context CPU_NPriv blocks this unauthorized access NP.

That being so, the same error Err cumulated with another error or fault injection Err/Flt_inj preventing the context transition cxt_swtch of the processing unit, could actually result in an illicit access to privileged data Dat_Priv by a non-privileged instruction.

Indeed, given the fact that the second error or fault injection Err/Flt_inj has resulted in the processing unit having remained in the privileged context CPU_Priv, the instructions scheduled to be executed in the non-privileged mode and controlling an access DAT_ACCS to privileged level data Dat_Priv, are authorized by the execution context CPU_Priv.

FIG. 1B illustrates a similar problem that might occur in the secure CPU_Sec and non-secure CPU_NSec execution contexts.

Given the fact that the hardware separation between the secure CPU_Sec and non-secure CPU_NSec execution contexts, the vulnerability does not arise during the context transitions NS→S cpy, S→NS cpy, usually highly protected, but during a secure processing phase Trtmt_S. Indeed, the secure processings Trtmt_S typically include computing phases, for example cryptographic ones, aiming performance and consequently typically less protected. Thus, an error or a fault injection Err/Flt_inj during the processing phase could cause writing of data derived from the secure processing CPU_Sec into a non-secure memory location Dat_NSec (because the secure execution context CPU_Sec could access by default the non-secure mode, in particular thanks to a memory management unit "MMU" (standing for "Memory Management Unit") and a secure attribution unit "SAU" (standing for "Secure Attribution Unit") of the processor.

SUMMARY

Embodiments provide processing units, in hierarchized execution contexts, against this type of vulnerabilities and the resulting dysfunctions.

In this respect, according to one embodiment, a method is provided comprising a phase of compiling, within a processing unit, a software program intended to be executed by said processing unit, said processing unit could have secure and non-secure access right level execution contexts, and/or privileged and non-privileged access right level execution contexts, the method comprising a compilation phase generating instructions in machine language having an exclusively secure access right level if these instructions are intended to be executed in the secure access right level execution context, and instructions having a non-privileged access right level if these instructions are intended to be executed in the non-privileged access right level execution context.

Indeed, one the one hand, the hierarchy between the secure and non-secure levels is typically made so that the secure level is capable of accessing the secure access right level and the non-secure access right level, whereas the non-secure level is capable of accessing only the non-secure access right level. On the other hand, the hierarchy between the privileged and non-privileged levels is typically made so that the privileged level is capable of accessing the privileged access right level and the non-privileged access right level, whereas the non-privileged level execution context is capable of accessing only the non-privileged access right level.

Yet, in one implementation, during a phase of executing the compiled software program, within the processing unit, said instructions having the executively secure access right level are capable of accessing secure access right level memory areas and are incapable of accessing memory areas having the non-secure access right level.

In other words, the instructions in machine language generated by the compilation phase according to this embodiment will be intrinsically incapable of producing an illicit access to data with an access right level not corresponding to the level in which they are executed.

Thus, on the one hand, an instruction executed in the secure level cannot cause writing of data derived from the secure execution context into a non-secure memory location.

And, on the other hand, an instruction having the non-privileged access right level cannot result in an access to privileged data, and that being so even though the processing unit is forced in the most "permissive" execution context, i.e. for example in the case where a context transition has failed and the processing unit has remained in the privileged access right level execution context to execute instructions normally intended for the non-privileged level execution context.

In practice, the instruction having the non-privileged access right level could be an attempt to access privileged data, which will generate an exception. The exception could be processed by the processor which could decide on how to manage this illicit attempt (and for example perform a complete reset, a restart of the application, or other steps).

According to one implementation, the compilation phase generates the instructions having the exclusively secure access right level if these instructions are intended to be executed in a particular processing phase of the secure access right level execution context, for example a secure processing phase typically more vulnerable to attacks than other phases of the secure execution context.

According to one implementation, the compilation phase comprises:
  a generation of the instructions in machine language irrespective of the execution contexts to which these instructions are intended to be executed, and
  a post-processing of the generated instructions, adapted to replace at least some generated instructions having an access right level not corresponding to the access right level of its execution context with instructions having the access right level corresponding to the access right level of its execution context.

By the verb "correspond" in "access right level of an instruction (not) corresponding to the access right level of its execution context", it should be understood the conditions of generation of the instructions as provided for in the compilation phase of the method according to the embodiment defined hereinbefore. This means that the exclusively secure access right level of an instruction is the access right level corresponding to the access right level of the secure execution context; and that the non-privileged access right level of an instruction is the access right level corresponding to the access right level of the non-privileged execution context.

Thus, the method can be adapted to existing compilation phases, without impacting the manner in which the instructions in machine language are generated in the compilation phase. Indeed, the post-processing is a simple and effective means for implementing the compilation phase according to this embodiment, and in a manner compatible and adaptable to any type of instruction in machine language.

According to one implementation, the post-processing comprises:
  a first identification of the instructions having the privileged access right level, amongst the instructions intended to be executed in the non-privileged access right level execution context, and
  a first substitution of the identified instructions with functionally equivalent instructions and having the non-privileged access right level.

In particular, this allows circumventing the case described with reference to FIG. 1A, i.e. the illicit access to the privileged access right level by instructions intended to be executed in the non-privileged access right level execution context.

According to one implementation, the post-processing comprises:
  a second identification of the instructions having a secure access right level capable of accessing memory areas having the secure access right level and memory areas having the non-secure access right level, amongst the instructions intended to be executed in the secure access right level execution context, and
  a second substitution of the identified instructions with functionally equivalent instructions and having an exclusively secure access right level.

In particular, this allows circumventing the case described with reference to FIG. 1B, i.e. the illicit transfer of secure access right level data into non-secure access right level memory areas.

According to one implementation, the post-processing step comprises a comparison of the instructions generated with a conversion table including a list of the instructions to be substituted and of the respective functionally equivalent instructions.

Herein again, this is a simple and effective means for implementing the post-processing, and in a manner compatible and adaptable to any type of instruction in machine language, and the conversion table could further be updated so as to cover a larger number of instructions that might cause a vulnerability or to adapt the method to new instructions that might cause new vulnerabilities.

According to one implementation, the compilation phase generates instructions in machine language from a source code in programming language, wherein the post-processing is implemented on at least one group of instructions intended to be executed in the same execution context, said at least one group of instructions being selected in at least one of the following forms:
  functions having a declaration communicating said selection, in the source code in programming language;
  objects belonging to an intermediate object file, generated upon compilation;
  areas with contiguous memory addresses containing binary data encoding the machine language instructions, generated upon compilation.

Indeed, upon compilation, it is possible to know which are the execution contexts of the different instructions, for example amongst the objects of an object file typically providing for all instructions, typically generated as an intermediate element before the instructions in machine language themselves.

Moreover, the compilation typically provides for a memory linking operation allowing arranging the binary data so as to group the codes of the instructions intended to be executed in the same execution context together in contiguous memory areas.

Furthermore, declarations of the functions of the source code could be specifically provided to perform the selection of the instructions of said group, enabling in particular a programmer (i.e. an author of the source code) to impose the implementation of the post-processing over a portion of his code, and conversely, to prevent the implementation of the post-processing over a portion of his code.

According to one implementation, the compilation phase generates instructions in machine language from a source code in programming language, and comprises:
    an identification, in the source code, of the execution contexts to which the instructions corresponding to the execution of the source code are intended,
    the generation of the instructions in machine language having the access right level corresponding to the execution contexts to which these instructions are intended to be executed.

In this alternative, the compilation phase is specifically provided to directly generate the instructions in machine language having access rights "intrinsically" corresponding to the execution context to which they are intended, in the manner provided for according to the embodiment defined hereinbefore. This could be advantageous in terms of performance of execution of the software program.

According to one implementation, the instructions intended to be executed in the non-privileged access right level execution context, are directly generated with the non-privileged access right level.

According to one implementation, the instructions intended to be executed in the secure access right level execution context, are directly generated with the exclusively secure access right level.

According to one implementation, said identification in the source code, comprises a selection of function having a declaration, in the source code, communicating said selection.

According to another embodiment, a computer program product is also provided comprising instructions which, when the program is executed by a computer, lead the latter to implement the method as defined hereinbefore.

According to yet another embodiment, a computer-readable medium is also provided comprising instructions which, when they are executed by a computer, lead the latter to implement the method as defined hereinbefore.

According to some embodiments, an integrated circuit is provided including a processing unit adapted to implement the compilation phase of the method as defined hereinbefore, and to execute the compiled software program, said processing unit could have secure and non-secure access right level execution contexts, and/or privileged and non-privileged access right level execution contexts.

According to further embodiments, an integrated circuit is provided including a processing unit adapted to have a secure access right level execution context and a non-secure access right level execution context, the processing unit being capable of processing instructions having an exclusively secure access right level and being physically configured so that an execution of said instructions could access secure access right level memory areas, and could not access non-secure access right level memory areas.

According to one embodiment, the processing unit is configured to test a data representative of the exclusively secure access right level, in a binary code of the executed instructions, and to process the instruction with the hardware configuration corresponding to the access right level communicated by said data.

BRIEF DESCRIPTION OF THE DRAWINGS

Other advantages and features of the invention will appear upon examining the detailed description of non-limiting embodiments and implementations, and from the appended drawings, wherein:

FIGS. 1A and 1B schematically illustrate a task execution flow of a processing unit having hierarchized execution contexts;

DETAILED DESCRIPTION OF ILLUSTRATIVE EMBODIMENTS

Figure 2:
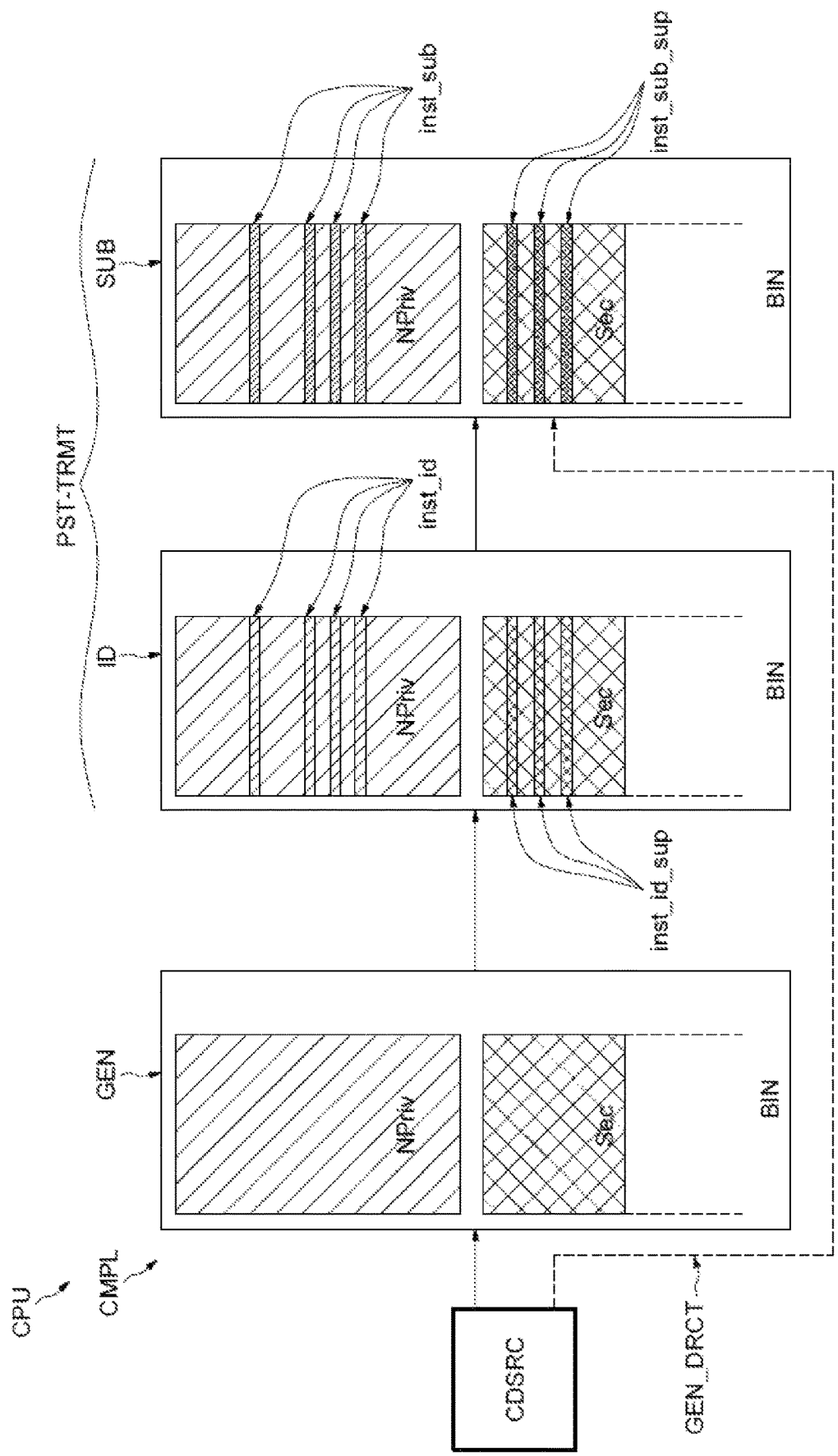
FIG. 2 represents a method for executing a software program.

FIG. 2 represents a method for executing a software program, for example by a processing unit CPU, comprising in particular a compilation phase CMPL generating instructions in machine language, usually from a source code in programming language CDSRC. Afterwards, the compiled software program is intended to be executed during an execution phase, by the processing unit CPU.

The method could, in practice, be in the form of a computer program comprising instructions which, when the program is executed by a computer, lead the latter to implement the method. The method could, in practice, also be in the form of a computer-readable medium comprising instructions which, when they are executed by a computer, lead the latter to implement the method.

Figure 4A:
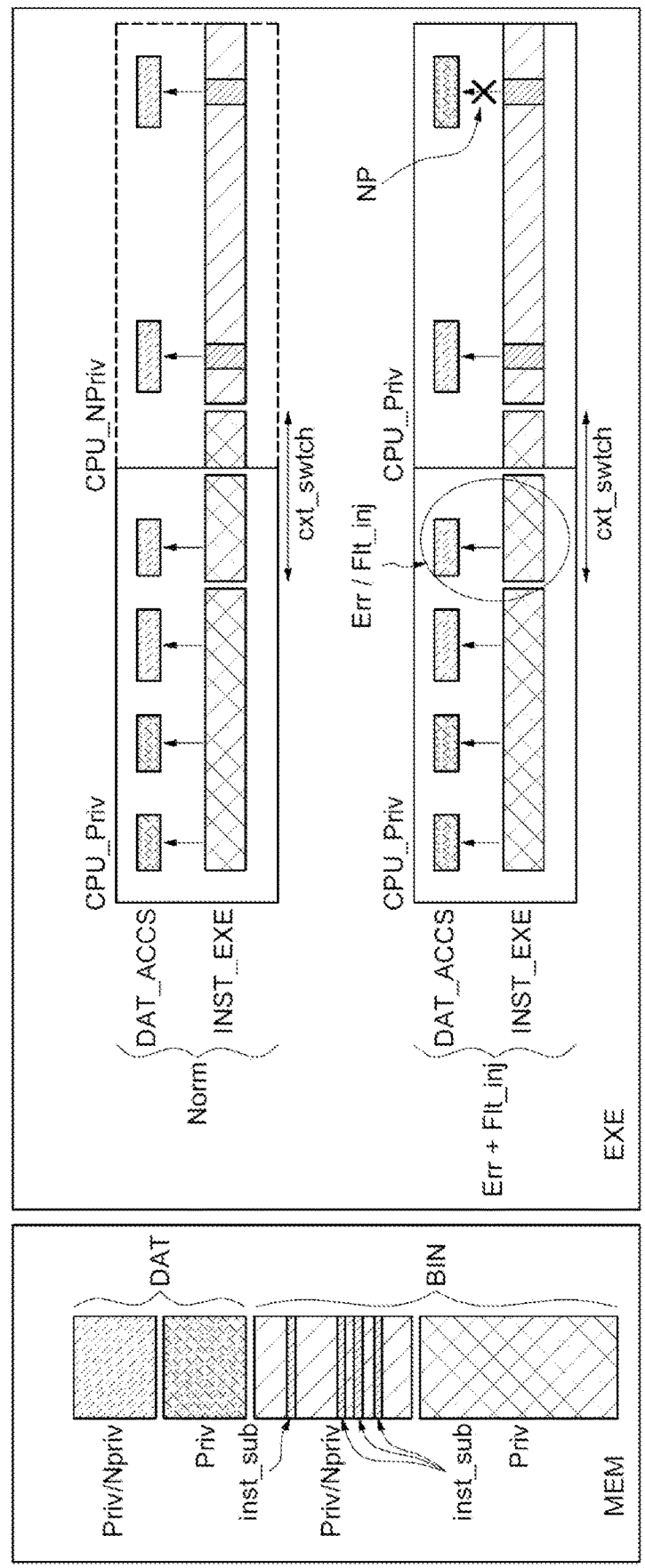
FIG. 4A schematically illustrates an execution flow of a software program by a processing unit having hierarchized execution contexts.
Figure 4B:
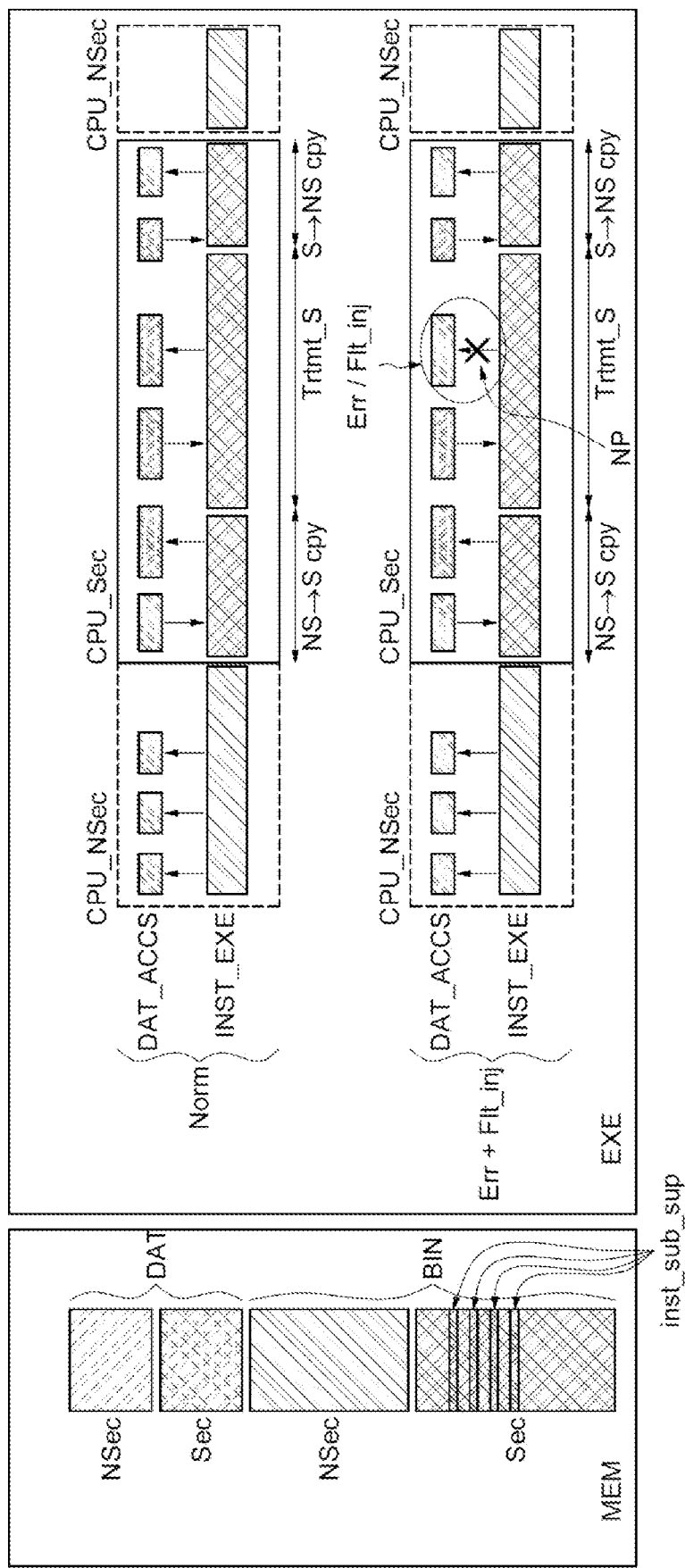
FIG. 4B schematically illustrates another execution flow of a software program by a processing unit having hierarchized execution contexts.

The processing unit, belonging for example to a microcontroller or microprocessor system, usually made in the form of an integrated circuit, may have a higher access right level execution context which could be the secure access right level CPU_Sec, and/or which could be the privileged access right level CPU_Priv, and a lower access right level execution context which could be the non-secure access right level CPU_NSec, and/or which could be the non-privileged access right level CPU_NPriv (FIGS. 4A-4B).

The terms secure level Sec and non-secure level NSec access rights as well as the terms privileged level Priv and non-privileged level NPriv access rights have the usual and conventional meaning well known to a person skilled in the art.

In particular, it should be noted that the privileged and non-privileged execution contexts could be used in a stand-alone manner, or as a "sub-context" of the secure and non-secure level execution contexts.

Figure 3:
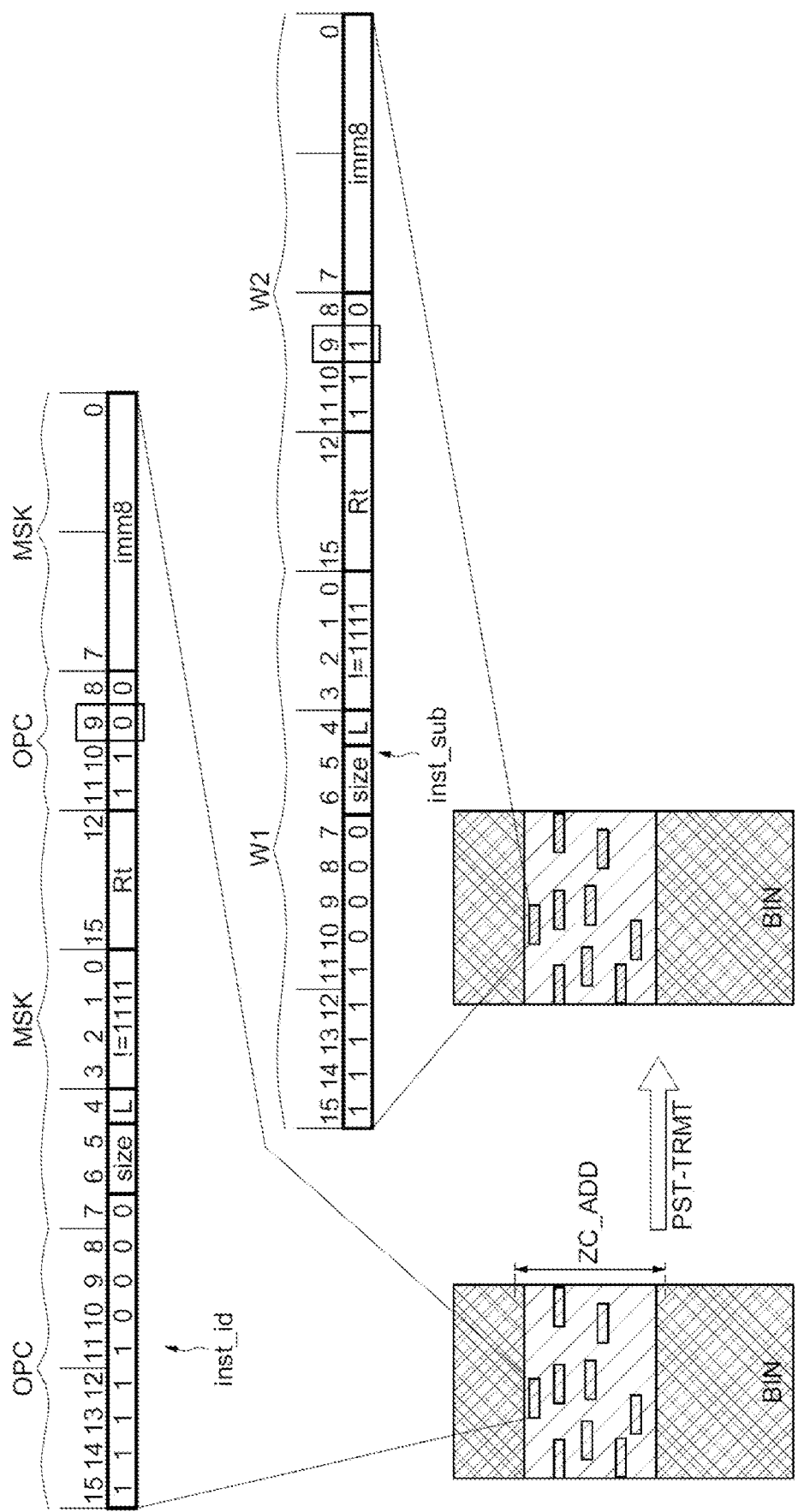
FIG. 3 illustrates a practical case of identifying and substituting an instruction with a substitution instruction from a selected one defined by an area with contiguous memory addresses containing binary data generated in the compilation phase.

In conventional compilations, typically, instructions in machine language are not generated according to the access right level in which they are intended to be executed. Furthermore, most instructions in machine language exist only with an hierarchically higher access right level inst_id (FIG. 3).

Yet, the compilation phase CMPL of this method is intended to generate instructions in machine language having an exclusively secure access right level if these instructions are intended to be executed in the secure access right level CPU_Sec execution context, and to generate instructions having a non-privileged access right level NPriv if these instructions are intended to be executed in the non-privileged access right level CPU_NPriv execution context.

In the compilation example CMPL illustrated in FIG. 2, the lower access right levels correspond to the "non-privileged" level NPriv, whereas the higher access right levels correspond to the "secure" level Sec, arbitrarily and for reasons relating to description brevity.

In a first alternative, the compilation phase CMPL first comprises a generation GEN of the instructions in machine language BIN followed by a post-processing PST-TRMT of the generated instructions.

The generation GEN of the instructions in machine language BIN is done irrespective of the execution contexts Priv, NPriv in which the generated instructions are intended to be executed, and all of the generated instructions have the hierarchically higher access right level. To summarize, the generation GEN of the compilation phase CMPL corresponds to what is done by a conventional compilation.

The post-processing PST-TRMT of the generated instructions is adapted to replace at least some of the generated instructions inst_id, inst_id_sup having an access right level not corresponding to the access right level of its execution context Priv, NPriv, with substitution instructions inst_sub, inst_sub_sup having an access right level corresponding to the access right level of its execution context Priv, NPriv.

By "correspond", it should herein be understood "correspond to the conditions of generation of the instructions in the compilation phase CMPL of the previously-described method". This means that the exclusively secure access right level of an instruction corresponds to the secure execution context; and that the non-privileged access right level of an instruction corresponds to the non-privileged execution context.

In this respect, the post-processing PST-TRMT includes on the one hand an identification step ID, followed by a substitution step SUB.

The identification step ID is configured to identify instructions inst_id amongst the instructions intended to be executed in the lower access right level NPriv execution context. The identified instructions inst_id_sup are the instructions that have the higher access right level Priv.

In turn, the substation step SUB is configured to replace the identified instructions inst_id with functionally equivalent instructions having the lower access right level inst_sub.

The post-processing PST-TRMT applied on the instructions intended to be executed in the lower access right level CPU_NPriv execution context is particularly, yet not exclusively, suited for the "privileged" Priv and "non-privileged" NPriv access rights. Indeed, this application allows in particular addressing the vulnerability that might arise in case of blockage of the transition of the execution context into the "non-privileged" lower access right level NPriv, as described hereinafter with reference to FIG. 4A.

Furthermore, the identification step ID could be configured to identify instructions inst_id_sup amongst the instructions intended to be executed in the higher access right level Sec execution context. The identified instructions inst_id_sup are the instructions that have a higher access right level, which could be called "non-exclusively" higher, i.e. capable of accessing memory areas having the higher access right level Sec and memory areas having the lower access right level NSec.

And, in this case, the substitution step SUB could be configured to replace said identified instructions inst_id_sup having the non-exclusively higher access right level, with functionally equivalent instructions having a so-called "exclusively" higher access right level inst_sub_sup, i.e. capable of accessing memory areas having the higher access right level and incapable of accessing memory areas having the lower access right level.

The post-processing PST-TRMT applied on the instructions intended to be executed in the higher access right level CPU_Sec execution context is particularly, yet non-exclusively, suited for the "secure" Sec and "non-secure" NSec access rights. Indeed, this application allows in particular addressing the vulnerability that might arise during a data processing phase Trmt_S in the "secure" higher access right level Sec execution context, typically less monitored and protected than the context transition phases, as described hereinafter with reference to FIG. 4B.

For example, the post-processing step PST-TRMT may be implemented by means of a conversion table containing a list of the instructions to be replaced inst_id, inst_id_sup, and for each instruction to be replaced inst_id, inst_id_sup, the corresponding substitution instruction inst_sub, inst_sub_sup, i.e. for example the same instruction but having different access rights (i.e. resp. the lower access right level inst_sub, and the exclusively higher access right level inst_sub_sup).

Moreover, the instructions, on which the post-processing PST-TRMT is applied, are selected, in particular according to the execution context CPU_Priv, CPU_NPriv, CPU_Sec, CPU_NSec in which they are intended to be executed. Still in particular, the instructions, on which the post-processing is applied, could be selected according to the type of processing carried out by the program, for example a processing type such as the processing Trtmt_S which is executed in the secure CPU_Sec execution context and which does not need to access the non-secure level NSec memory areas.

Thus, the instructions could be selected so that they are intended to be executed in the same execution context NPriv, Priv.

Indeed, the execution contexts CPU_Priv, CPU_NPriv, CPU_Sec, CPU_NSec, are defined by the compilation phase CMPL (GEN), so that the compilation "knows" which are the execution contexts of the different instructions. More particularly, the compilation could identify different particular processing phases of a given context. For example, the compilation may identify in particular secure processing phases Trtmt_S and context transition phases NS→S cpy, S→NS cpy in the secure CPU_Sec and non-secure CPU_NSec execution contexts (cf. hereinafter with reference to FIG. 4B).

Thus, the selection of the groups of instructions could be easily done according to the execution context of said instructions, and even according to a processing phase performed in the corresponding context.

Also, the identification ID and substitution SUB steps could be on different forms of the instructions, corresponding to different time points of the compilation phase CMPL.

For example, the instructions may be selected in the source code CDSRC, by means of declarations of the functions of the source code CDSRC specifically designed for this purpose. The declarations allow communicating, in a manner chosen by the programmer, the selection of the instructions relating to the functions declared in this manner for the post-processing PST-TRMT.

For example, the instructions may be selected in an object file generated in the compilation phase CMPL. Indeed, the compilation phase CMPL may typically comprise a generation of an intermediate file, called object file (whose suffix is often denoted "o") containing objects of the code, in particular the instructions. In the object files, the execution contexts and the processing phases of the objects are known, and thus the selection of the groups of instructions could be easily done according to the execution context and/or the processing phases of the corresponding objects.

For example, the instructions may be selected in binary data BIN encoding the machine language instructions, generated upon compilation. Indeed, the compilation phase CMPL may typically store binary data BIN encoding the instructions intended to be executed in the same execution context Priv, NPriv, in areas with contiguous memory addresses ZC_ADD (FIG. 3). This may also be the case for the binary data BIN encoding the instructions intended to be executed in a particular processing phase Trtmt_S, of a given context.

In this respect, reference is made to FIG. 3.

FIG. 3 illustrates a practical case of identifying ID and substituting SUB an instruction inst_id with a substitution instruction inst_sub from a selected one defined by an area with contiguous memory addresses ZC_ADD containing binary data BIN generated GEN in the compilation phase CMPL.

In this example, each instruction in machine language inst_id, inst_sub is encoded over two 16-bit 0-15 words $W_1$, $W_2$, including an operational code OPC over the bits 7-15 of the first word $W_1$, and over the bits 8-11 of the second word $W_2$, as well as so-called "mask" data MSK over the bits 0-6 of the first word $W_1$ and over the bits 0-7 and 12-15 of the second word $W_2$.

To summarize, the operational code OPC allows defining the nature of the instruction, whereas the mask MSK corresponds to parameters of the instruction.

In particular, and according to an arbitrary example, the bit9 of the second word $W_2$ allows defining a permission level assigned to the instruction. The high permission level, encoded for example when the bit9 is set at 0, corresponds to the hierarchically higher access right level. The low permission level, encoded for example when the bit9 is set at 1, corresponds to the hierarchically lower access right level.

Thus, in this example, the substitution instruction inst_sub is identical to the instruction identified to be replaced inst_id, except the bit9 equal to 1 in the substitution instruction inst_sub. This corresponds to the case of replacement of an instruction inst_id having the higher access right level (the bit9 of the second word=0), amongst the instructions intended to be executed in the lower access right level NPriv execution context, with a functionally equivalent instruction inst_sub having the lower access right level (the bit9 of the second word=1).

Moreover, it is possible to provide for a coding on the bits of the operational code OP defining a permission level corresponding to an exclusively secure access right level, i.e. capable of accessing the secure access right level Sec memory areas but not the non-secure access right level NSec memory areas.

In this respect, the processing unit CPU is capable of processing instructions having an exclusively secure access right level inst_sub_sup by being physically configured so that an execution of said instructions inst_sub_sup could access secure access right level CPU_Sec memory areas, and could not access non-secure access right level CPU_NSec memory areas.

Thus, the processing unit CPU could be configured to test said coding, i.e. the data representative of the exclusively higher access right level, in a binary code OPC of the executed instructions, and to process the instruction inst_sub_sup with the hardware configuration corresponding to the access right level communicated by said coding.

Reference is made again to FIG. 2.

In a second alternative GEN_DRCT, the compilation phase CMPL comprises an identification, in the source code CDSRC, of the execution contexts NPriv, Sec and of the portions corresponding to the processing phases (Trtmt_S), to which the instruction corresponding to the execution of the source code CDSRC are intended. And, the compilation phase CMPL comprises a generation GEN_DRCT of the instructions in machine language having directly the access right level corresponding to the execution contexts in which these instructions are intended to be executed.

In particular, this second alternative advantageously provides for the identification in the source code CDSRC of a selection of functions having a declaration, enabling (for example a programmer) to communicate that the instructions relating to the compilation of said declared functions, should be directly generated GEN_DRCT with the permission level (for example communicated by the bit9) corresponding to the execution context in which said instructions are intended to be executed.

FIG. 4A schematically illustrates an execution flow of a software program by a processing unit having hierarchized execution contexts (privileged Priv and non-privileged NPriv), in the same manner as described before with reference to FIG. 1A, but in the case where the software program execution is implemented by the method described before with reference to FIGS. 2 and 3.

Elements common with the previous FIGS. 1A, 2 and 3, bear the same references and not all of them will be detailed again.

The mapping of the memory MEM, corresponding to the configuration of the access right levels defined for example by a memory management unit "MMU" or "MPU" (acronyms of the usual English terms "Memory Management Unit" and, respectively, "Memory Protection Unit") associated or not to a memory firewall, is further represented.

Thus, the memory MEM includes a memory area BIN containing the binary data, generated upon compilation, encoding the machine language instructions, for the privileged Priv execution context and for the non-privileged NPriv execution context. Furthermore, the memory MEM contains memory areas DAT containing data relating to the implementation and to the results obtained by the executions in the privileged context Priv and in the non-privileged context NPriv.

It should be noted that in a "natural" state of the mapping of the memory MEM, the lower access right level NPriv memory areas are accessible by both the lower access right level and the higher access right level "Priv/NPriv".

Thus, and in particular, the compilation phase CMPL has generated at least some of the instructions in machine language inst_sub intended to be executed in the lower access right level NPriv execution context, with a lower access right level inst_sub.

This has no particular impact on the normal executions Norm.

Conversely, in the case of an error, and/or possibly a fault injection, Err+Flt_inj preventing the context transition cxt_swtch of the processing unit, so that the processing unit has remained in the privileged context CPU_Priv, then the instructions scheduled to be executed in the non-privileged mode NPriv and controlling an access DAT_ACCS to privileged level data Dat_Priv, are not forbidden by the execution context CPU_PRIV.

Yet, by construction, the instructions inst_sub executed in the non-privileged mode NPriv, are incapable of accessing DAT_ACCS privileged level data Dat_Priv.

Indeed, the instructions in machine language generated by the compilation phase CMPL of the method are intrinsically incapable of producing an illicit access to higher access right level data, and that being so even though the processing unit is forced in the execution context having the most permissive access right level, i.e. the higher level.

FIG. 4B schematically illustrates an execution flow of a software program by a processing unit having hierarchized execution contexts (secure Sec and non-secure NSec), as well as processing phases Trtmt_S, NS→S cpy, S→NS cpy relating to said contexts, in the same manner as described before with reference to FIG. 1B, but in the case where the software program execution is implemented by the method described before with reference to FIGS. 2 and 3.

Figure 1B:
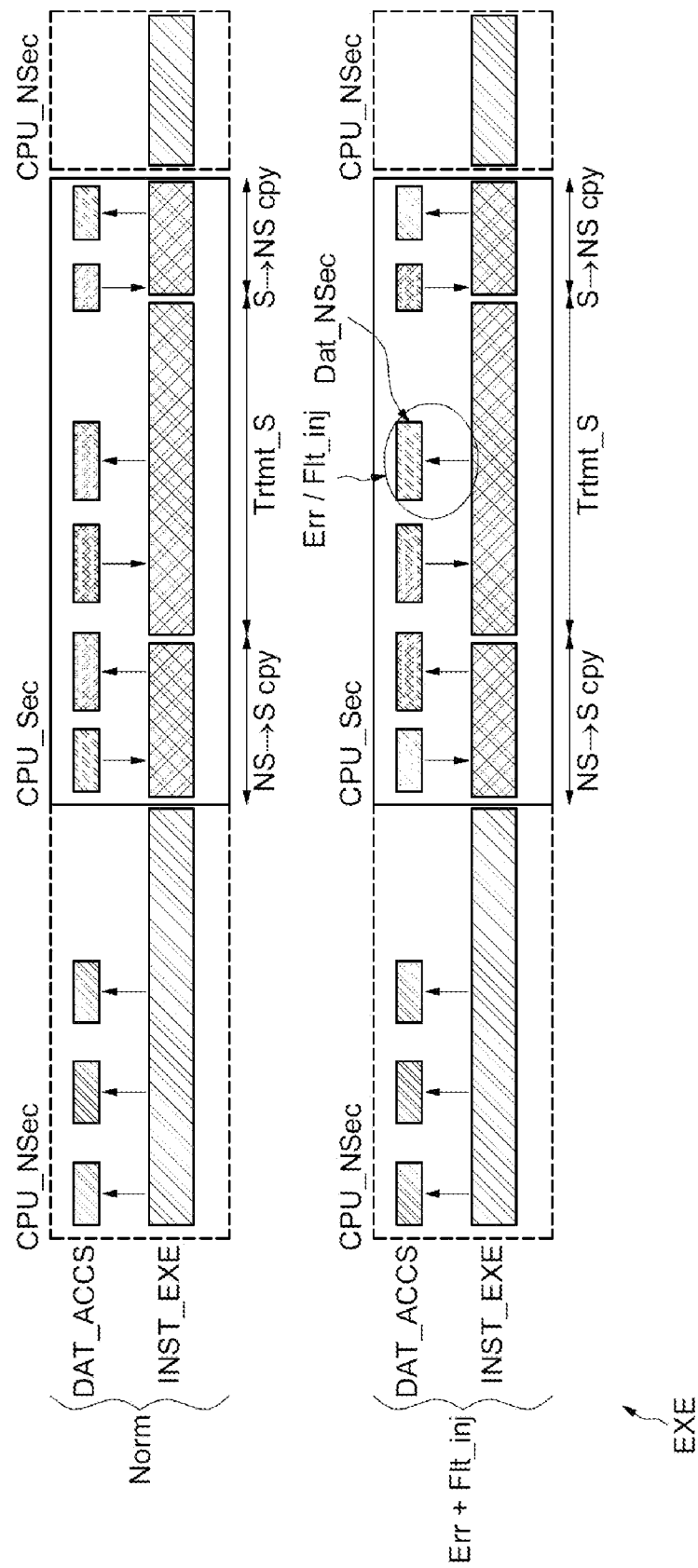

Elements common with the previous FIGS. 1B, 2 and 3, bear the same references and not all of them will be detailed again.

The mapping of the memory MEM, corresponding to the configuration of the access right levels defined for example by a memory firewall and a memory management unit "MMU" or "SAU" (acronyms of the usual English terms "Memory Management Unit" and, respectively, "Security Attribution Unit"), is further represented.

Thus, the memory MEM includes a memory area BIN containing the binary data, generated upon compilation, encoding the machine language instructions, for the secure execution context Sec and for the non-secure execution context NSec. Furthermore, the memory MEM contains memory areas DAT containing data relating to the implementation and to the results obtained by the executions in the secure context Sec and in the non-secure context NSec. The memory areas containing the codes of instructions intended to be executed in a given processing phase Trtmt_S, could also be identified in the memory MEM.

It should be noted that in a "natural" state of the mapping of the memory MEM, the memory areas containing the lower access right level NSec data DAT are accessible by both the lower access right level and the higher access right level "Sec/NSec".

Thus, and in particular, the compilation phase CMPL has generated at least some of the instructions in machine language inst_sub_sup intended to be executed in the higher access right level Sec execution context, with an exclusively higher access right level inst_sub_sup. For example, said at least some instructions inst_sub_sup are the instructions intended to be executed in the particular processing phase Trtmt_S.

This has no particular impact on the normal executions Norm.

Conversely, in the case of an error, and/or possibly a fault injection, Err+Flt_inj during the secure processing phase Trtmt_S resulting in an attempt to write data derived from the secure processing CPU_Sec into a non-secure memory location Dat_NSec, the writing is impossible to implement.

Indeed, by construction, the instructions inst_sub_sup are incapable of accessing DAT_ACCS non-secure level data DAT_NSec.

Thus, the instructions in machine language generated by the compilation phase CMPL of the method are intrinsically incapable of producing an illicit access to lower access right level data, during a particular processing phase Trtmt_S of the higher access right level Sec execution context, for example during a secure processing phase Trtmt_S in which the mechanisms for verifying compliance with the access rights are typically lesser, than for example in the context transition phases NS→S cpy, S→NS cpy.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method comprising:
compiling, by a processor in a compiling phase, a software program intended to be executed by the processor, the processor having secure and non-secure access right level execution contexts, and privileged and non-privileged access right level execution contexts;
generating, in the compilation phase, instructions in machine language having an exclusively secure access right level when the instructions are intended to be executed in the secure access right level execution context, and instructions having a non-privileged access right level when the instructions are intended to be executed in the non-privileged access right level execution context,
wherein generating, in the compilation phase, the instructions comprises:
generating the instructions in the machine language irrespective of the execution contexts to which the instructions are intended to be executed, and
post-processing the generated instructions thereby replacing at least some generated instructions having an access right level not corresponding to an access right level of its execution context with instructions having the access right level corresponding to the access right level of its execution context,
wherein generating, in the compilation phase, the instructions comprises generating the instructions in the machine language from a source code in programming language, and
wherein post-processing is implemented on at least one group of instructions intended to be executed in the same execution context, the at least one group of instructions being selected in at least one of the following forms:
functions having a declaration communicating the selection in the source code in the programming language;
objects belonging to an intermediate object file, generated upon compilation; or
areas with contiguous memory addresses containing binary data encoding the machine language instructions, generated upon the compilation.

2. The method according to claim 1, further comprising executing, by the processor in an execution phase, the compiled software program, wherein the instructions having the executively secure access right level are capable of accessing secure access right level memory areas and are incapable of accessing memory areas having the non-secure access right level.

3. The method according to claim 1, wherein generating, in the compilation phase, the instructions comprise generating the instructions having the exclusively secure access right level when the instructions are intended to be executed in a particular processing phase of the secure access right level execution context.

4. The method according to claim 1, wherein post-processing the generated instructions comprise:
providing a first identification of the instructions having the privileged access right level, amongst the instructions intended to be executed in the non-privileged access right level execution context; and
providing a first substitution of an identified instructions with functionally equivalent instructions and having the non-privileged access right level.

5. The method according to claim 1, wherein post-processing the instructions comprise:
providing a second identification of the instructions having a secure access right level capable of accessing memory areas having the secure access right level and memory areas having a non-secure access right level amongst the instructions intended to be executed in the secure access right level execution context; and
providing a second substitution of the identified instructions with functionally equivalent instructions and having the exclusively secure access right level.

6. The method according to claim 1, wherein post-processing comprises comparing the instructions generated with a conversion table including a list of the instructions to be substituted and of respective functionally equivalent instructions.

7. The method according to claim 1, wherein generating, in the compilation phase, the instructions comprises:
providing an identification, in the source code, of the execution contexts to which the instructions corresponding to the execution of the source code are intended; and
generating the instructions in the machine language having the access right level corresponding to the execution contexts to which these instructions are intended to be executed.

8. The method according to claim 7, wherein the instructions intended to be executed in the non-privileged access right level execution context are directly generated with the non-privileged access right level.

9. The method according to claim 7, wherein the instructions intended to be executed in the secure access right level execution context are directly generated with the exclusively secure access right level.

10. The method according to claim 7, wherein the identification in the source code comprises a selection of the functions having the declaration in the source code, and communicating the selection.

11. A computer-readable non-transitory recording medium storing a program including program instructions that, when executed by a processor, cause the processor to perform operations comprising:
compiling, in a compiling phase, a software program intended to be executed by the processor, the processor having secure and non-secure access right level execution contexts, and privileged and non-privileged access right level execution contexts; and
generating, in the compilation phase, instructions in machine language having an exclusively secure access right level when the instructions are intended to be executed in the secure access right level execution context, and instructions having a non-privileged access right level when the instructions are intended to be executed in the non-privileged access right level execution context,
wherein generating, in the compilation phase, the instructions comprises:
generating the instructions in the machine language irrespective of the execution contexts to which the instructions are intended to be executed, and
post-processing the generated instructions thereby replacing at least some generated instructions having an access right level not corresponding to an access right level of its execution context with instructions having the access right level corresponding to the access right level of its execution context,
wherein generating, in the compilation phase, the instructions comprises generating the instructions in the machine language from a source code in programming language, and
wherein post-processing is implemented on at least one group of instructions intended to be executed in the same execution context, the at least one group of instructions being selected in at least one of the following forms:
functions having a declaration communicating the selection, in the source code in the programming language;
objects belonging to an intermediate object file, generated upon compilation; or
areas with contiguous memory addresses containing binary data encoding the machine language instructions, generated upon the compilation.

12. An integrated circuit comprising:
a processor configured to:
compile, in a compiling phase, a software program intended to be executed by the processor, the processor having secure and non-secure access right level execution contexts, and privileged and non-privileged access right level execution contexts; and
generate, in the compilation phase, instructions in machine language having an exclusively secure access right level when the instructions are intended to be executed in the secure access right level execution context, and instructions having a non-privileged access right level when the instructions are intended to be executed in the non-privileged access right level execution context,
wherein the processor is configured to generate, in the compilation phase, the instructions by:
generating the instructions in the machine language irrespective of the execution contexts to which the instructions are intended to be executed; and
post-processing the generated instructions thereby replacing at least some generated instructions having an access right level not corresponding to an access right level of its execution context with instructions having the access right level corresponding to the access right level of its execution context,
wherein the processor is further configured to generate, in the compilation phase, the instructions by generating the instructions in the machine language from a source code in programming language, and wherein post-processing is implemented on at least one group of instructions intended to be executed in the same execution context, the at least one group of instructions being selected in at least one of the following forms:

functions having a declaration communicating the selection, in the source code in the programming language;

objects belonging to an intermediate object file, generated upon compilation; or areas with contiguous memory addresses containing binary data encoding the machine language instructions, generated upon the compilation.

13. The integrated circuit according to claim 12, wherein the processor is further configured to execute, in an execution phase, the compiled software program, wherein the instructions having the executively secure access right level are capable of accessing secure access right level memory areas and are incapable of accessing memory areas having the non-secure access right level.

14. The integrated circuit according to claim 12, wherein post-processing the instructions comprises:

providing a first identification of the instructions having the privileged access right level, amongst the instructions intended to be executed in the non-privileged access right level execution context; and providing a first substitution of an identified instructions with functionally equivalent instructions and having the non-privileged access right level.

15. The integrated circuit according to claim 12, wherein post-processing the instructions further comprises:

providing a second identification of the instructions having a secure access right level capable of accessing memory areas having the secure access right level and memory areas having a non-secure access right level, amongst the instructions intended to be executed in the secure access right level execution context; and providing a second substitution of the identified instructions with functionally equivalent instructions and having the exclusively secure access right level.

16. The integrated circuit according to claim 12, wherein the processor is configured to:

test data representative of the exclusively secure access right level, in a binary code of the executed instructions; and process the instructions with a hardware configuration corresponding to the access right level communicated by the data.

17. The integrated circuit according to claim 12, wherein the processor is configured to:

provide an identification, in the source code, of the execution contexts to which the instructions corresponding to the execution of the source code are intended; and generate the instructions in the machine language having the access right level corresponding to the execution contexts to which these instructions are intended to be executed.

18. The integrated circuit according to claim 17, wherein the instructions intended to be executed in the non-privileged access right level execution context are directly generated with the non-privileged access right level.

19. The integrated circuit according to claim 17, wherein the instructions intended to be executed in the secure access right level execution context are directly generated with the exclusively secure access right level.

* * * * *